Nov. 13, 1934.    G. H. CLARK ET AL    1,980,317
REEL SEAT
Filed June 17, 1932
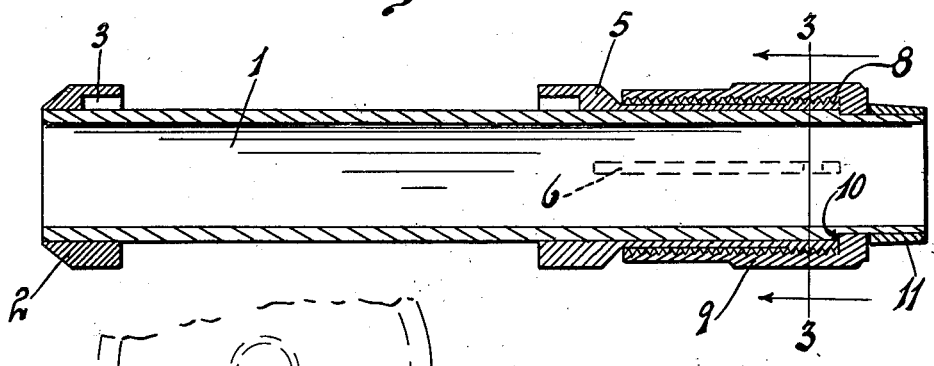
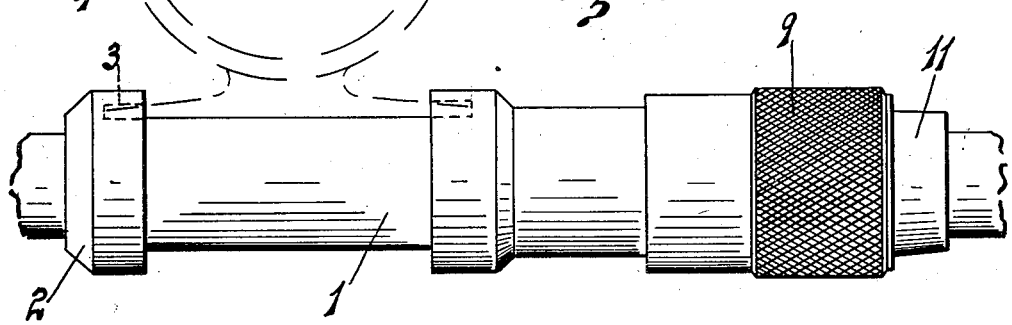
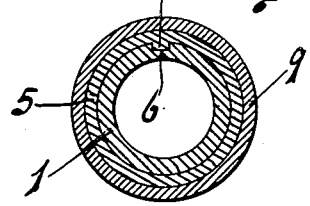
INVENTORS.
GEORGE H. CLARK.
REX E. YATES.
BY
ATTORNEY Patented Nov. 13, 1934

1,980,317

UNITED STATES PATENT OFFICE 1,980,317

REEL SEAT

George H. Clark and Rex E. Yates, Long Beach, Calif., assignors to Frederick W. Breder, Houston, Tex.

Application June 17, 1932, Serial No. 617,688

2 Claims. (Cl. 43—22)

This invention relates to a reel seat whereby a fishing reel is removably attached to a pole.

An object of our invention is to provide a novel reel seat which will effectively hold a reel in position by means of a slidable sleeve which engages the reel.

Another object is to provide a novel reel seat which will not accidentally release the reel when in use.

A further object is to provide a reel seat of the character stated, which is simple in construction and effective in operation.

Other objects, advantages and features of inventon may appear from the accompanying drawing, the subjoined detailed description and the appended claims.

In the drawing:

Figure 1 is a longitudinal, sectional view of our reel seat.

Figure 2 is a side elevation of the same.

Figure 3 is a sectional view taken on line 3—3 of Figure 1.

Referring more particularly to the drawing, the numeral 1 indicates a tubular shaft which is suitably attached to the fishing pole. A collar 2 is fixedly secured to one end of the shaft 1, and this collar is provided with a recess 3 into which one end of the base of the reel 4 extends. A sleeve 5 is slidably mounted on the shaft 1 and is held against rotation by means of an elongate groove 6 which is cut in the shaft 1, and the sleeve 5 is formed with a depending key 7 which enters the groove 6. Thus it will be evident that the sleeve can slide longitudinally along the shaft 1, but can not rotate around the shaft. The sleeve 5 is externally threaded as at 8, and a nut 9 is internally threaded and screws on to the sleeve 5. Both threads are left hand, so that clockwise rotation of the nut will move the sleeve into engagement with the reel.

The rear end of the shaft 1 is reduced in diameter so as to form a shoulder 10. The nut 9 fits against this shoulder and is thus held against longitudinal movement. A ring 11 is secured to the end of the shaft 1 and butts against the nut 9, thus holding the nut against the shoulder 10 and also preventing the nut from slipping off of the end of the shaft. It will be evident from the foregoing description that rotation of the nut 9 will cause the sleeve 5 to move along the shaft and either engage or disengage the base of the reel 4. The sleeve can be pressed tightly against the reel, and it can not move away to release the reel unless the nut 9 is rotated. The nut 9 is held against longitudinal movement as described, and the threaded coupling between the nut and the sleeve will prevent the sleeve from moving longitudinally, unless the nut is rotated to accomplish this result.

Having described our invention, we claim:

1. A reel seat comprising a shaft, means on said shaft for receiving one end of a reel base, a sleeve slidably and non-rotatably mounted on the shaft, said sleeve having means to receive the other end of the reel base, threads on the sleeve, a nut, threads on the nut engaging the threads on the sleeve, a shoulder on the shaft, said nut engaging the shoulder, and a ring secured to the shaft and butting against the nut whereby the nut is held against longitudinal movement on the shaft.

2. A reel seat comprising a shaft, means on said shaft for receiving one end of a reel base, a sleeve, said sleeve having means to receive the other end of the reel base, said shaft having a longitudinal groove formed therein, a key depending from the sleeve and extending into said groove, external threads on the sleeve, a nut, internal threads in the nut, a shoulder on said shaft, said nut bearing against the shoulder, and a ring secured to the end of the shaft and butted against the nut.

GEORGE H. CLARK.
REX E. YATES.